US00RE41155E

(19) United States
(12) Reissued Patent
Sato

(10) Patent Number: US RE41,155 E
(45) Date of Reissued Patent: Mar. 2, 2010

(54) IMAGE RECORDING APPARATUS

(75) Inventor: Yoshiaki Sato, Minamiashigara (JP)

(73) Assignee: Olympus Corporation, Tokyo (JP)

(21) Appl. No.: 10/152,250

(22) Filed: May 21, 2002

Related U.S. Patent Documents

Reissue of:

(64) Patent No.: 6,067,398
Issued: May 23, 2000
Appl. No.: 08/771,874
Filed: Dec. 23, 1996

(30) Foreign Application Priority Data

Dec. 27, 1995 (JP) ..... H7-341327

(51) Int. Cl.
*H04N 5/91* (2006.01)

(52) U.S. Cl. ..... 386/46; 386/94

(58) Field of Classification Search ..... 386/46, 386/94, 107, 113, 117, 1, 52, 56, 118, 125, 386/126, 45; 360/15, 13, 32
See application file for complete search history.

(56) References Cited

U.S. PATENT DOCUMENTS 4,855,779 A 8/1989 Ishikawa et al. ..... 386/117
5,067,029 A 11/1991 Takahashi ..... 386/117
5,617,407 A * 4/1997 Bareis
5,822,493 A * 10/1998 Uehara et al.
5,857,059 A 1/1999 Yamagishi ..... 386/125

* cited by examiner

*Primary Examiner*—Robert Chevalier
(74) *Attorney, Agent, or Firm*—Volpe and Koenig, P.C.

(57) ABSTRACT

In an image recording apparatus according to this invention, an image recording media which has an image data recording area and an image data management area for managing the recording state of image data in the image data recording area and cannot be overwritten is applied, and an image data unerased area of the recording media is detected by an unerased area detection circuit when a recording mode is set by a recording mode setting REC switch, so that the image data in the detected unerased area is substantially erased by a CPU. In this state, the CPU waits for the start of an image recording operation by operating a recording trigger switch. According to this apparatus, a high-speed recording operation can be performed without missing a chance of recording even if a recording media which cannot be overwritten is applied as an image information recording media.

27 Claims, 15 Drawing Sheets

FIG.15
Amended
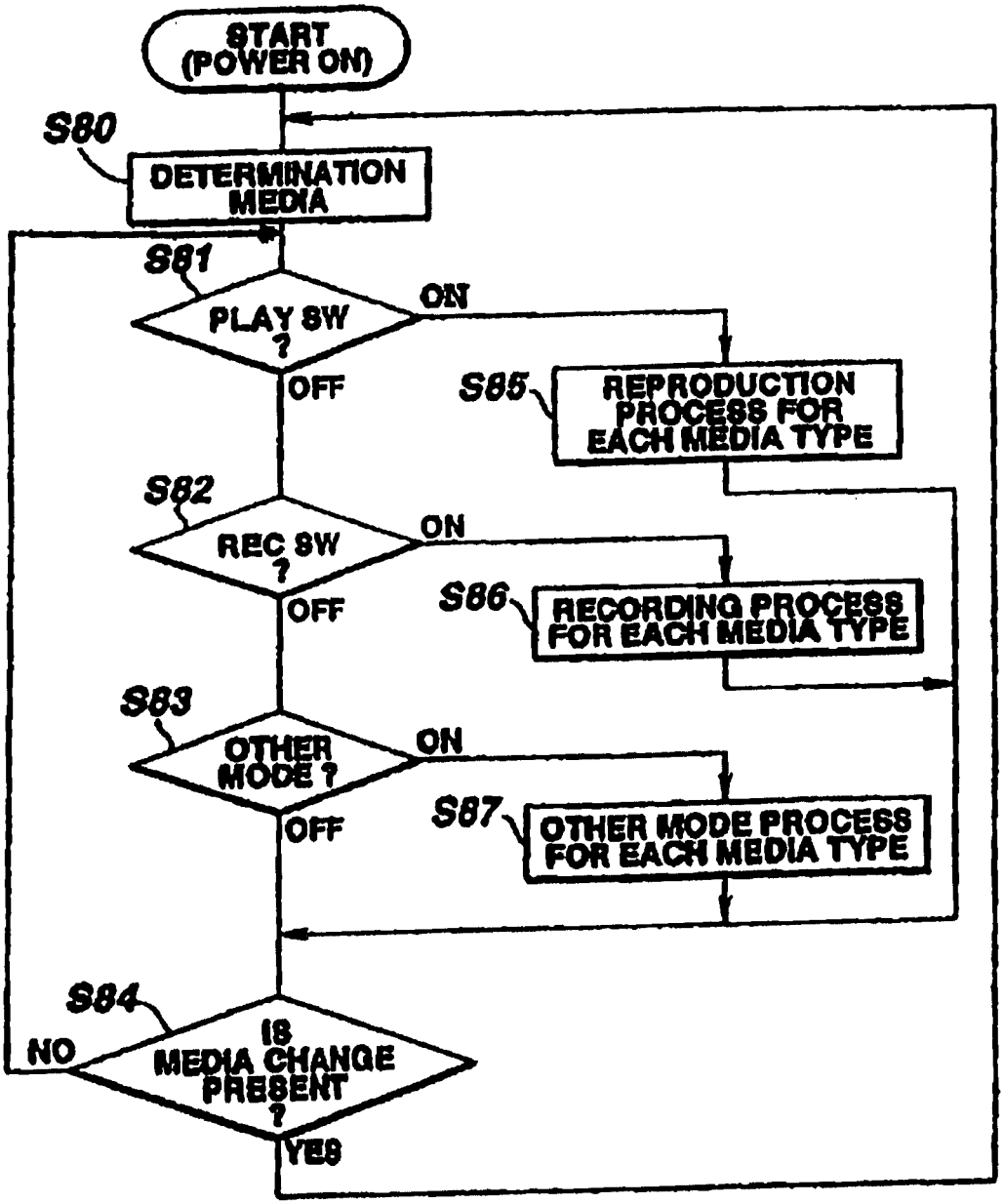

IMAGE RECORDING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image recording apparatus and, more particularly, to an image recording apparatus in which a recording media which cannot be overwritten is applied.

2. Related Art Statement

A conventional image recording apparatus in which a magnetic recording media such as a floppy disk is applied as a recording media for image information is known. In such an image recording apparatus, image information is recorded as an analog signal in each track area on concentric circles formed on the recording media. When an erasing operation is to be performed, an erasing operation is magnetically performed to a corresponding track area to erase the image information in the track area.

In recent years, as an image recording apparatus called a digital electronic still camera, an image recording apparatus in which digital data based on image information is recorded on a semiconductor memory such as an S-RAM or the like serving as a recording media has been popularized. In an image recording apparatus such as a digital electronic still camera, image information originally consists of digital data. For this reason, the image recording apparatus has been not only used as a recording apparatus for image information, but also has occupied a very important and superior position as a tool for picking up an image in an image system environment using personal computers or the like.

Therefore, in such an image recording apparatus, as an image data management format in the recording media, a format following a DOST FAT file system which is extremely popularly used in the above information system environment is advantageously used.

The logical structure of an image data recording media based on a DOS system, and the outline of the management of image data recording media will be described below. FIG. 19 shows the logical structure of the recording media. The media serving as a recording media is roughly constituted by the four following areas:

(1) an area 31 in which a parameter representing a logical structure is described.

(2) a first management area 32a in which a map representing the position of a file in a data area is recorded (number of sectors in this area is (sector/FAT)×2)).

(3) a second management area 32b, having a fixed size, in which the name and file size of a registered file (number of sectors in this area is (total number of root directory entries)+(number of bytes/sector+32)).

(4) an area 33 which is used as a recording area of the main body of data of a registered file and/or a sub management area where sub-directory information is recorded (number of sectors in this area is (total number of sectors in the media—(number of sectors of a root directory+number of sectors per FAT×number of FATs+number of reserved sectors)).

In a DOS FAT (FILE ALLOCATION TABLE) file system, of the above areas, the area 31 is called a boot sector; the first management area 32a, an FAT; the second management area 32b, a root directory (data management area); and the area 33, a data recording area.

In the root directory of the area 32b, since the number of entries which is predetermined for each media is determined, when only a data file is registered, only files corresponding to the number of entries are registered. For this reason, not only a file but also a new directory (sub-directory) can be registered in the directory. In any case, the main body of a file or a directory to be registered is recorded in the data recording area 33.

A recording position of the data area, registration to a media, and deletion are managed by the directory and the FAT 32a. When a file or directory is registered in the root directory 32b, a file name, a directory name, auxiliary information such as a file size and a date, and the entry number of the FAT 32a are recorded in the entry. The data recording area 33 is divided into logical recording units called, e.g., clusters 34.

Each entry of the FAT 32a is one-to-one-related to each cluster of the data recording area. In the entry of the FAT 32a, the number of an entry to be traced next and a code representing the final entry (no entry to be traced next) or an unused entry are recorded. Therefore, a specific cluster, in the data recording area 33, in which data or a directory is recorded can be recognized in the following manner. That is, the entry of the first FAT described in a directory entry is accessed, and entry numbers written in the entry are sequentially traced.

The above is a mechanism of registering and reproducing a file or a directory. In a sub-directory, the entry area of a directory is only placed in the data recording area 33. The management of files and directories registered in the sub-directory is the same as that in a root directory.

An erasing operation performed by an erasing mode in a conventional image recording apparatus is a so-called pseudo erasing operation, and means a process in which the start of a file name recorded in an entry of the area 32b in FIG. 19 is set to 0, the area of the FAT 32a in which a cluster number on which the data of the file is placed is described is set to FFh (h indicates hexadecimal notation). Therefore, in a conventional image recording apparatus, the data in a file which is erased is still left in the data recording area 33.

In an image recording apparatus such as a conventional digital electronic still camera described above, when image data is to be erased, a predetermined process such as an erasing process is performed to an image data management area such as a known directory area in a DOS FAT file system, so that image data in the image data recording and is pseudo-erased. When the recording media is constituted by an S-RAM, even if image data is temporarily left in the image data recording area, over-writing can be performed. For this reason, a recording operation for subsequent image data can be performed without any inconvenience.

In recent years, a recording media using a flash memory which is a semiconductor memory and cannot be overwritten such that recording/erasing can be repeated without a backup power supply as used in an S-RAM begins to be used as an image recording apparatus of this type.

However, when the recording medium which is constituted by a flash memory or the like and cannot be overwritten is applied to the image recording apparatus for the conventional digital electronic still camera described above, the following problem is also posed.

More specifically, even if a predetermined process is performed to an image data management area in the same manner as described above as in a case wherein a media using an S-RAM is applied to erase image data in a recording media in the image recording apparatus of this type, although a pseudo erasing operation for the image data can be performed, subsequent image data cannot be recorded in the image data recording area because the media cannot be overwritten. Therefore, the necessity of a substantially erasing operation for image data which is performed independently of a pseudo-erasing operation further rises.

As a result, assume that a recording mode is set, and that a rare recording chance, i.e., a chance of pressing a shutter release comes. In this case, when image data is not substantially erased, a time-lag is required to perform the substantially erasing operation. For this reason, the image is missed, and desired image information cannot be recorded on the recording medium.

OBJECT AND SUMMARY OF THE INVENTION

The present invention has been made in consideration of the above circumstances, and has as its object to provide an image recording apparatus which can perform high-speed recording without missing a chance of recording when a recording media which cannot be overwritten is employed as a recording media for image information.

An image recording apparatus according to the present invention in which an image recording media which logically has an image data recording area and an image data management area for managing a recording state of image data in the image data recording area and cannot be overwritten is applied, and including image data pseudo-erasing means for executing a predetermined process to the image data management area to erase the image data on the image recording media, so that the image data on the image data recording area is pseudo-erased, comprises recording mode setting means for setting a recording mode for recording image data on the image recording media, unerased area detection means for performing an erasing operation by the image data pseudo-erasing means to detect an image data unerased area left in the image data recording area in the image recording media, image data erasing means for substantially erasing image data in the unerased area detected by the unerased area detection means, and control means for performing control such that the unerased area detection means detects an image data unerased area in response to a recording mode setting operation by the recording mode setting means, and the image data erasing means starts a substantially erasing operation for image data in the detected unerased area.

In the image recording apparatus, the unerased area detection means detects an image data unerased area in response to a recording mode setting operation by the recording mode setting means, and a substantially erasing operation for image data in the detected unerased area is started by the image data erasing means. According to the image recording apparatus, even if a media which cannot be overwritten is used, a period of time from when a recording trigger switch is pressed to when recording is completed is shortened, and a change of pressing a shutter release is rarely missed.

Other characteristic features and advantages of the present invention will be sufficiently apparent with reference to the following description.

BRIEF OF DESCRIPTION OF THE DRAWINGS

FIG. 15 is a flow chart of a processing operation of an image recording apparatus according to a seventh embodiment of the present invention.

DETAILED DESCRIPTION OF THE PREFERRED EMBODIMENTS

Figure 1:
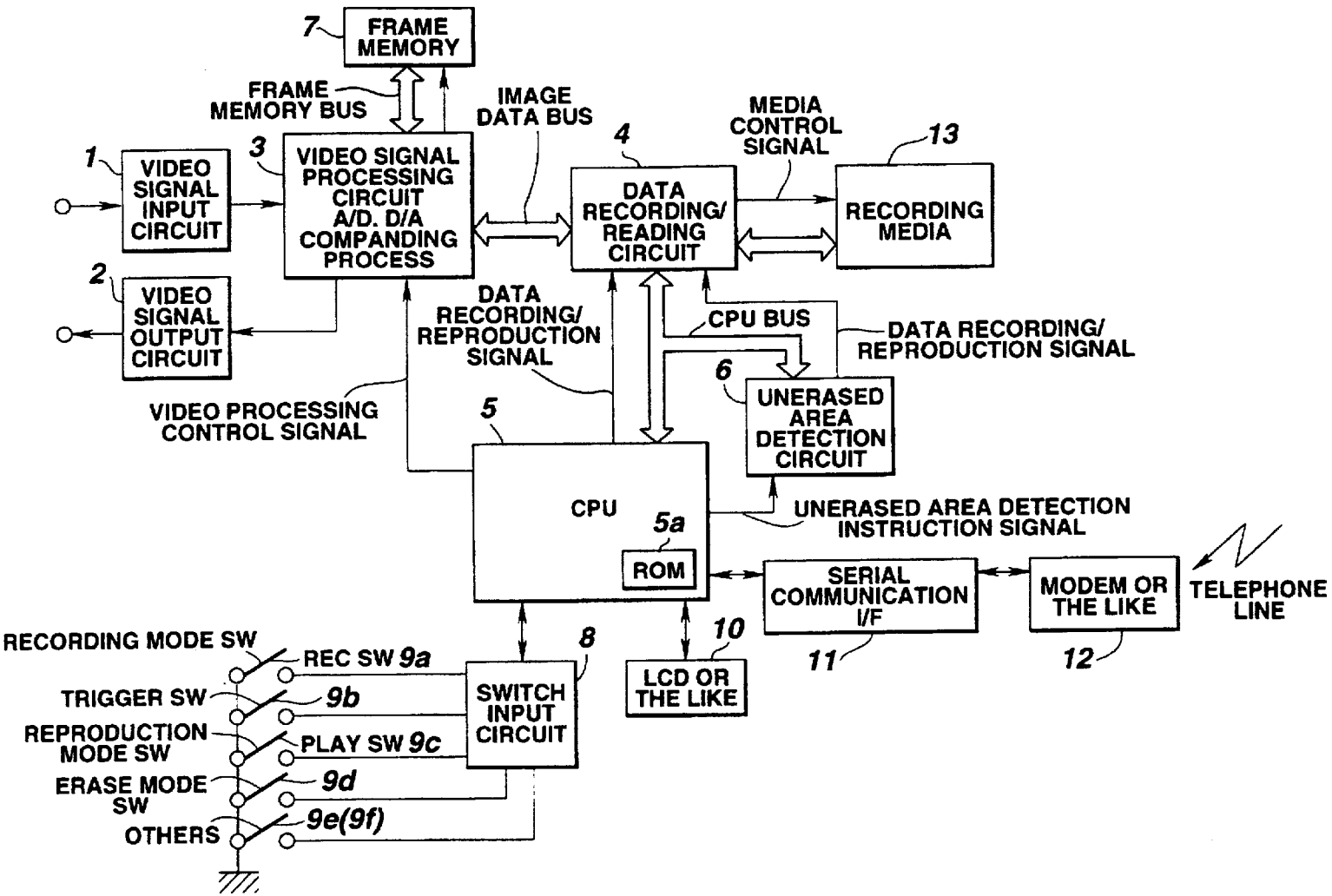
FIG. 1 is a block diagram showing an image recording apparatus according to a first embodiment of the present invention.
Figure 19:
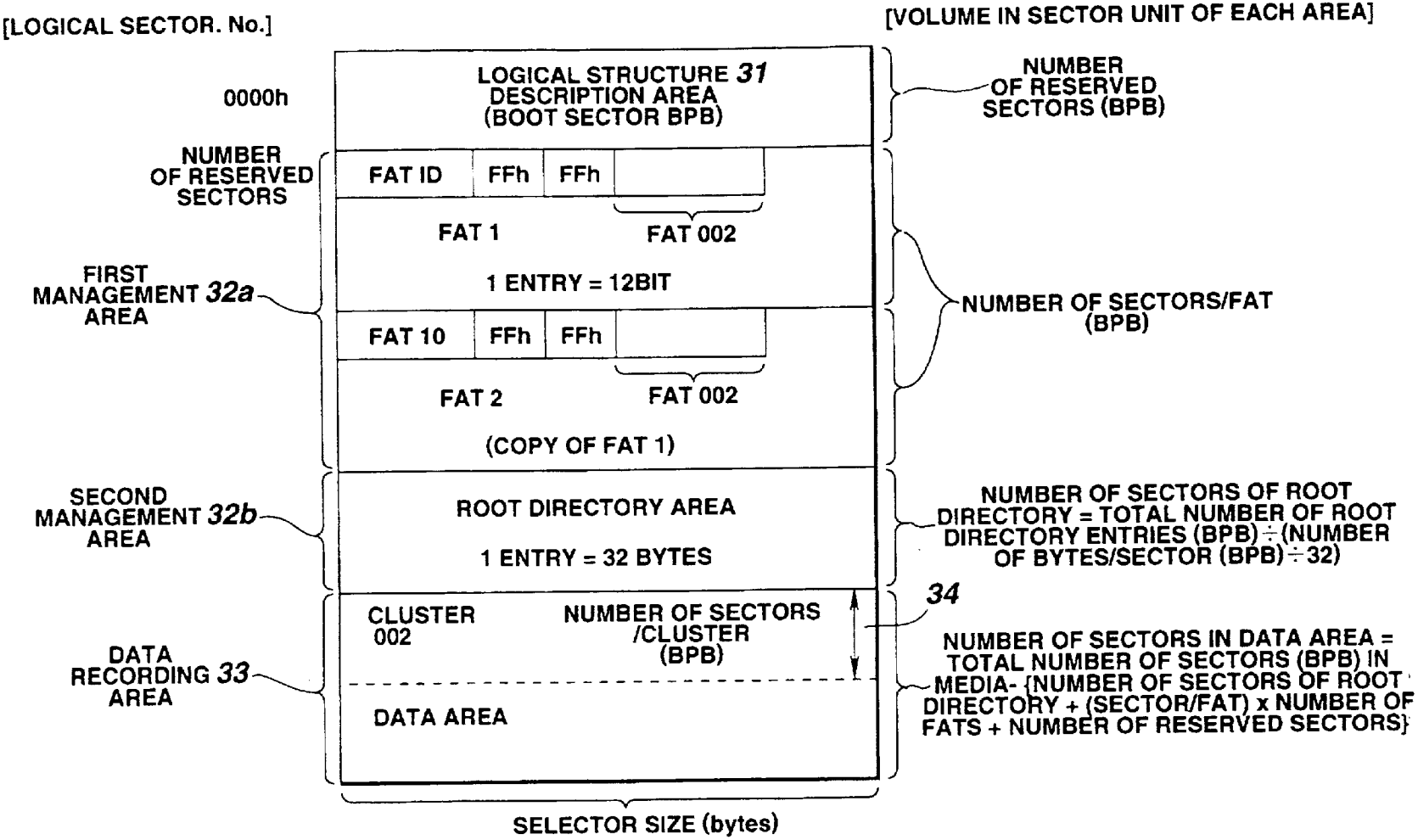
FIG.19 RELATED ART
FIG. 19 is a view showing the memory logical structure of a recording media applied to a conventional image recording/reproducing apparatus.

Embodiments of the present invention will be described below with reference to the accompanying drawings. FIG. 1 is a main block diagram showing an image recording apparatus according to the first embodiment of the present invention. Image data management in the image recording apparatus according to this embodiment is performed in accordance with the above DOS FAT file system shown in FIG. 19.

As shown in the block diagram in FIG. 1, this image recording apparatus comprises a video signal input circuit 1 for mainly receiving a video signal, a video signal output circuit 2 for outputting a video signal to a monitor or the like, a video signal processing circuit 3 for performing an input/output process for a video signal, a data recording/reading circuit 4 for recording/reading data on/from an image recording media 13, an unerased area detection circuit 6 serving as an unerased area detection means, a frame memory 7 for storing image data, switches 9a to 9f for mode setting or a trigger, a switch input circuit 8 for inputting the state of the switches, an LCD 10 for displaying a mode, a frame number, or the like, a modem 12 for receiving information from a telephone line, a serial communication interface (I/F) 11 for a modem, an image recording media 13, built in the apparatus or detachable from the apparatus, for recording image data, a CPU 5 serving as a control means for controlling the above control elements, and the like.

The switch group 9 is constituted by a recording mode switch (REC SW) 9a for setting a recording mode, a recording trigger switch (trigger SW) 9b, a reproduction mode switch (PLAY SW) 9c for setting a reproduction mode, an erase mode switch (erase mode SW) 9d for setting an erase mode and designating a pseudo erasing operation for image data or a substantially erasing operation (to be described later), and an other mode setting switch (other mode SW) 9e.

The video signal processing circuit 3 inputs or outputs a video signal through the video signal input circuit 1 or the video signal output circuit 2, and performs A/D conversion, D/A conversion, compression, a commanding process, and the like of the video signal on the basis of a video processing control signal from the CPU 5.

The data recording/reading circuit 4 records a video signal on the image recording media 13 or reads a video signal from the image recording media 13 on the basis of a data recording/reproduction signal from the CPU 5. At this time, the CPU 5 accesses the image recording media 13 through a CPU bus and the data recording/reading circuit 4.

The unerased area detection circuit 6 receives an unerased area detection instruction signal from the CPU 5 and causes the video signal output circuit 2 to control the data recording/reading circuit 4, thereby searching for an unerased area in the image recording media 13. The unerased area detection circuit 6 notifies the sector or cluster number of the area to the CPU 5 through the CPU bus.

In addition to the control means for the control elements, an image data pseudo-erasing means, an image data erasing means, an image reception mode setting means, a compression mode setting means, a media type determination means, a fixed storage means, a processing program adding means, and the like are incorporated in the CPU 5.

The image recording media 13, which is a recording media which cannot be overwritten, may be incorporated in the image recording apparatus, and may be a detachable recording media. When the image recording media 13 is a detachable recording media, an effect obtained by this apparatus is enlarged (to be described later). As the type of the image recording media 13, a flash memory is used in this embodiment. However, the image recording media 13 may be a recording media such as a photomagnetic disk which cannot be overwritten. In the recording media, a state wherein image data is pseudo-erased is frequently set. As a result, the effect of the present invention is enlarged.

The pseudo-erasing operation for the image data is performed in the following manner. That is, as described in FIG. 19, the start of a file name recorded in an entry of the area 32b serving as the second management area is set to 0, and the area of the FAT 32a serving as the second management area where a cluster number on which the data of the image file is placed is described is set to FFh, thereby erasing the image data. Therefore, the main body of the data of the erased image file is still left in the data recording area 33.

The flow of a signal in this image recording apparatus will be described below. A video signal is input to the video signal input circuit 1 in a recording mode, A/D-converted by the video signal processing circuit 3, and recorded on the frame memory 7. When the recording trigger SW 9b is pressed, data read from the frame memory 7 is compressed by the video signal processing circuit 3. The compressed data is output to the data recording/reading circuit 4 to be recorded on the image recording media 13.

In a reproduction mode, image data is read from the recording media 13 by the data recording/reading circuit 4 and output to the video signal processing circuit 3. The image data is subjected to an extending process in the video signal processing circuit 3, recorded on the frame memory 7, and then D/A-converted to be output to an external monitor or the like through the video signal output circuit 2.

The unerased area detection circuit 6 described above can be programmed, and the program can be stored in a ROM 5a in the CPU 5. In this image recording apparatus, image transmission can be performed by the serial communication interface 11 and the modem 12 through a telephone line.

An operation mode of the image recording apparatus will be described below with reference to the flow chart in FIG. 2. When a power supply is turned on, the recording apparatus starts steps S01, S02, and S03 to detect a pressed switch of the switches 9a to 9f.

When the PLAY SW 9c is pressed, the flow shifts to step S05. In this case, although the recording apparatus may have a reproduced frame as an initial value, the reproduced frame is designated, and the designated frame is reproduced in step S06. Thereafter, it is checked in step S07 whether a mode change is present. If NO in step S07, the flow returns to step S05, steps S05 to S07 are executed until the mode change occurs. When the mode change occurs, the flow returns to step S01 to detect a pressed switch of the switches 9a to 9f.

If it is detected that the REC SW 9a is pressed, the flow shifts to step S08. In this case, an unerased area is detected by the unerased area detection circuit 6. The details of the processing in step S08 will be described later in the flow chart in FIG. 3.

Thereafter, the flow shifts to step S09 to substantially erase the unerased area. The flow shifts to step S10 to wait until the recording trigger SW 9b is pressed. When the recording trigger SW 9b is not pressed, the flow shifts to step S12. If a mode change occurs, the flow shifts to step S01. However, if no mode change occurs, the flow returns to step S10 to execute steps S10 to S12 until a mode change occurs.

When the recording trigger SW 9b is pressed, the flow shifts to step S11 to perform a recording process. In addition, it is determined in step S12 whether a mode change is present.

It is determined in step S03 whether the other mode SW 9e is pressed. If YES in step S03, the flow shifts to step S04 to execute another mode.

Figure 3:
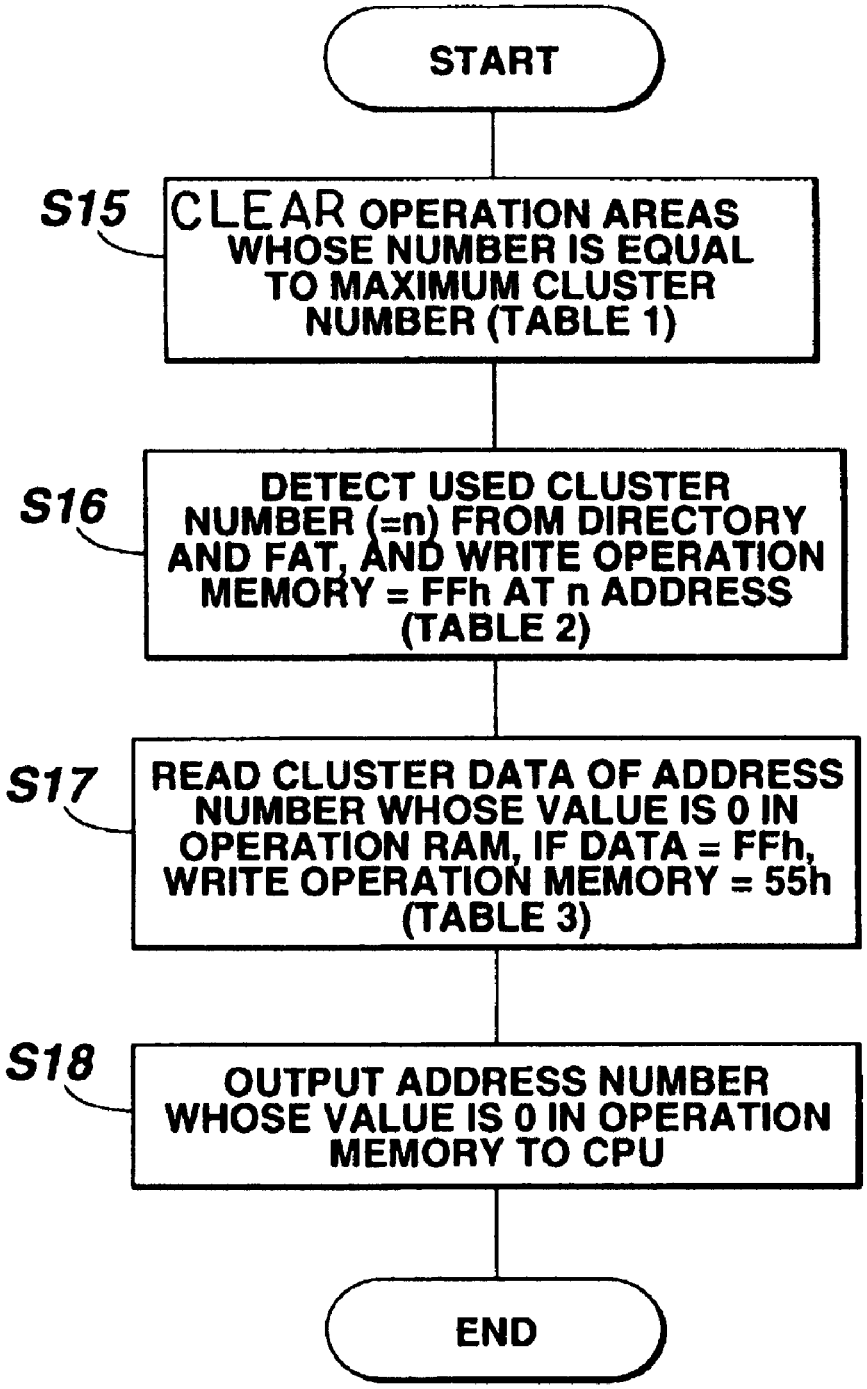
FIG. 3 is a flow chart of an erased area detection processing operation in the image recording apparatus in FIG. 1.

In this case, an unerased area detection processing operation by the unerased area detection circuit 6 in step S08 will be described below with reference to the flow chart in FIG. 3. The flow chart in FIG. 3 shows a processing operation of the unerased area detection circuit 6 which has received an erased area detection instruction signal. Operation memory areas whose number is equal to the maximum number of clusters of the recording media 13 are cleared in step S15. More specifically, as shown in Table 1, operation areas at addresses 0 to N are assured, and all the values of the areas are set to 0h.

TABLE 1

| Address | 0 | 1 | 2 | ... | ... | ... | ... | ... | N |
|---|---|---|---|---|---|---|---|---|---|
| Value (h) | 0 | 0 | 0 | 0 | 0 | 0 | 0 | 0 | 0 |

The flow shifts to step S16 to detect a used cluster number on the basis of the directory of the media and the FAT, and FFh is written as data in an operation memory at the address represented by the cluster number. This will be described below with reference to Table 2. Since the areas of cluster numbers 1 and 2 are used as files, data at addresses 1 and 2 in the operation memory area are defined as FFh.

TABLE 2

| Address | 0 | 1 | 2 | ... | ... | ... | ... | ... | N |
|---|---|---|---|---|---|---|---|---|---|
| Value (h) | 0 | FF | FF | ... | ... | ... | ... | ... | 0 |

When data are written as described above, a portion corresponding to the used cluster number is marked.

Furthermore, in step S16, an operation of detecting a used cluster number on the basis of the directory and FAT is executed in all of the clusters.

Upon completion of the above processes, in step S17, a cluster at an address number where data is 0h in an operation RAM is read from the image recording media 13. If the data is FFh, 55h is written as data for an operation memory (see Table 3).

For example, since data is 0h at address 0 of the operation memory, data at the cluster address is read from the recording media 13. If the data is FFh, the area is substantially erased. For this reason, 55h is written at an address of the operation memory to be marked. Even if marking is performed such that FFh is written as described above, the same operation as described above can be performed.

TABLE 3

| Address | 0 | 1 | 2 | ... | ... | ... | ... | ... | N |
|---|---|---|---|---|---|---|---|---|---|
| Value (h) | 55 | FF | FF | ... | ... | ... | ... | ... | 0 |

In step S18, an address where a value is 0h in the operation memory is output to the CPU 5. In Table 3, when the operation memory is searched after all the clusters are checked, it is determined that an address where the value is 0 is N address. Therefore, since the cluster N address of the recording media 13 is a pseudo-erased cluster, the address N is output to the CPU 5.

The above processing contents will be described below using Tables 1 to 3 again. A portion where a value is finally FFh is a cluster which has been used as a file. A portion where a value is 55h is an area which has been substantially erased. Although an area where data is 0h is pseudo-erased, data is still left in a corresponding data area in the recording media 13.

Thereafter, in the image recording apparatus, an area where data is pseudo-erased but left is substantially erased. When image data is actually recorded, data can be recorded in an area (area on a recording media subjected to a substantially erasing operation) corresponding to an address where data is 0h on the operation memory and an area (area which is originally substantially erased) corresponding to an address where data is 55h on the operation memory.

According to the image recording apparatus of the first embodiment described above, a recording media which cannot be overwritten and has an area in which image data is pseudo-erased is used, a substantially erasing operation is performed during recording mode setting before image data is recorded. For this reason, a period of time from when the recording trigger SW 9b is pressed to when recording of the image data on the recording media 13 is completed is shortened, and a chance of pressing a release shutter is rarely missed.

An image recording apparatus according to the second embodiment of the present invention will be described below. In transmission of image data through a telephone line, when the above substantially erasing operation of a recording media is performed during transmission, transmission time is prolonged, and a telephone fee becomes large. The image recording apparatus of this embodiment solves the above problem.

This image recording apparatus has almost the same arrangement as that shown in FIG. 1. However, a process performed after a reception mode is set by an image reception mode SW 9f is different from that of the apparatus of the first embodiment. Therefore, constituent control elements will be described by using the same reference numerals and symbols as those in the first embodiment.

Figure 4:
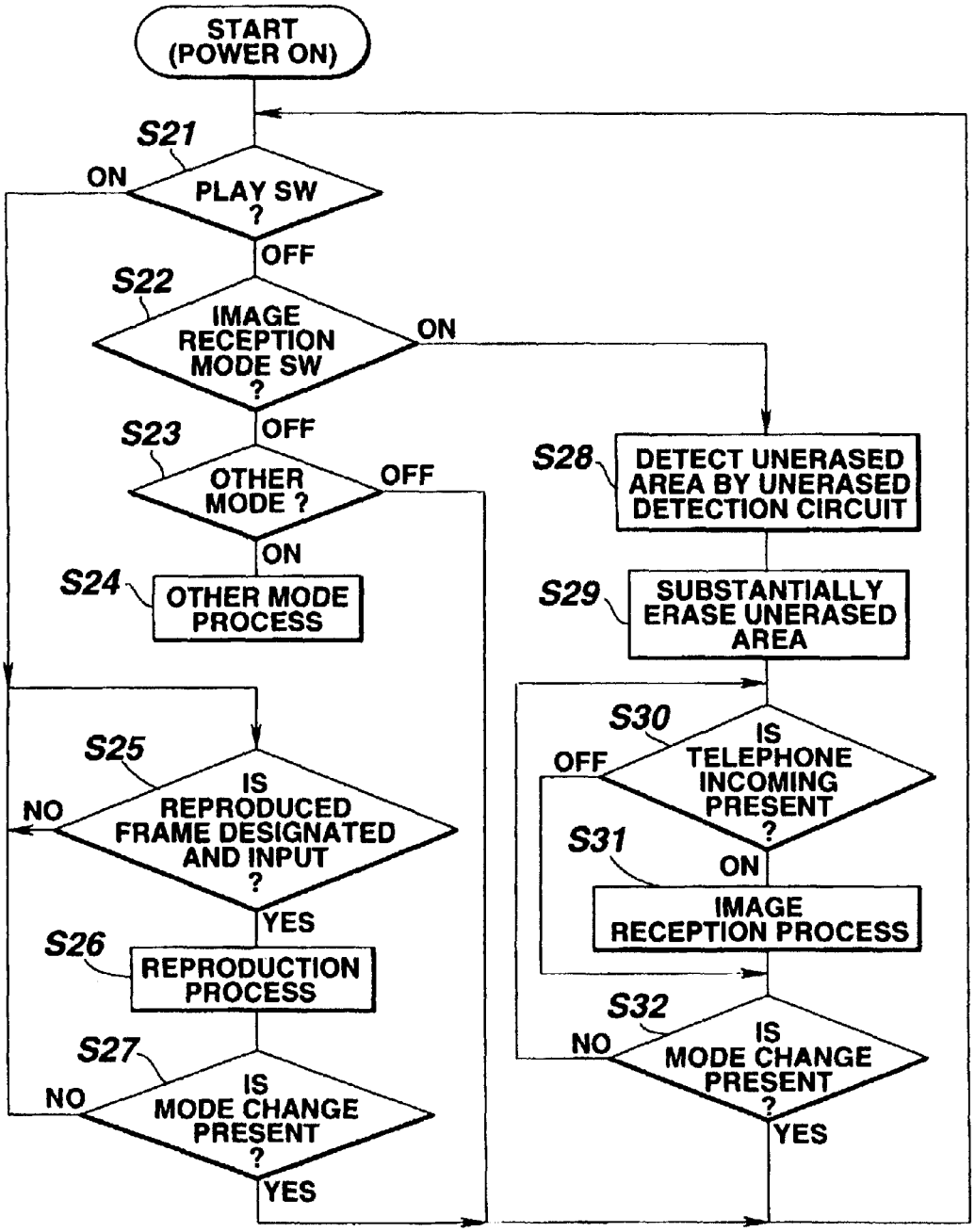
FIG. 4 is a flow chart of a processing operation in an image recording apparatus according to a second embodiment of the present invention.

FIG. 4 is a flow chart of an operation mode process in the image recording apparatus. After a power supply is turned on (power ON), a pressed mode SW in the routines in steps S21, S22, and S23 is detected. For example, when a PLAY SW 9c is pressed, the flow shifts from step S21 to step S25, and the same processes as in steps S05 and the subsequent steps in FIG. 2 are executed.

When an other mode SW 9e is pressed, the flow advances to respectively step S24 to execute processes related to the mode selected. When the mode change occurs, the flow returns to step S21 to perform an operation for detecting a mode.

Figure 2:
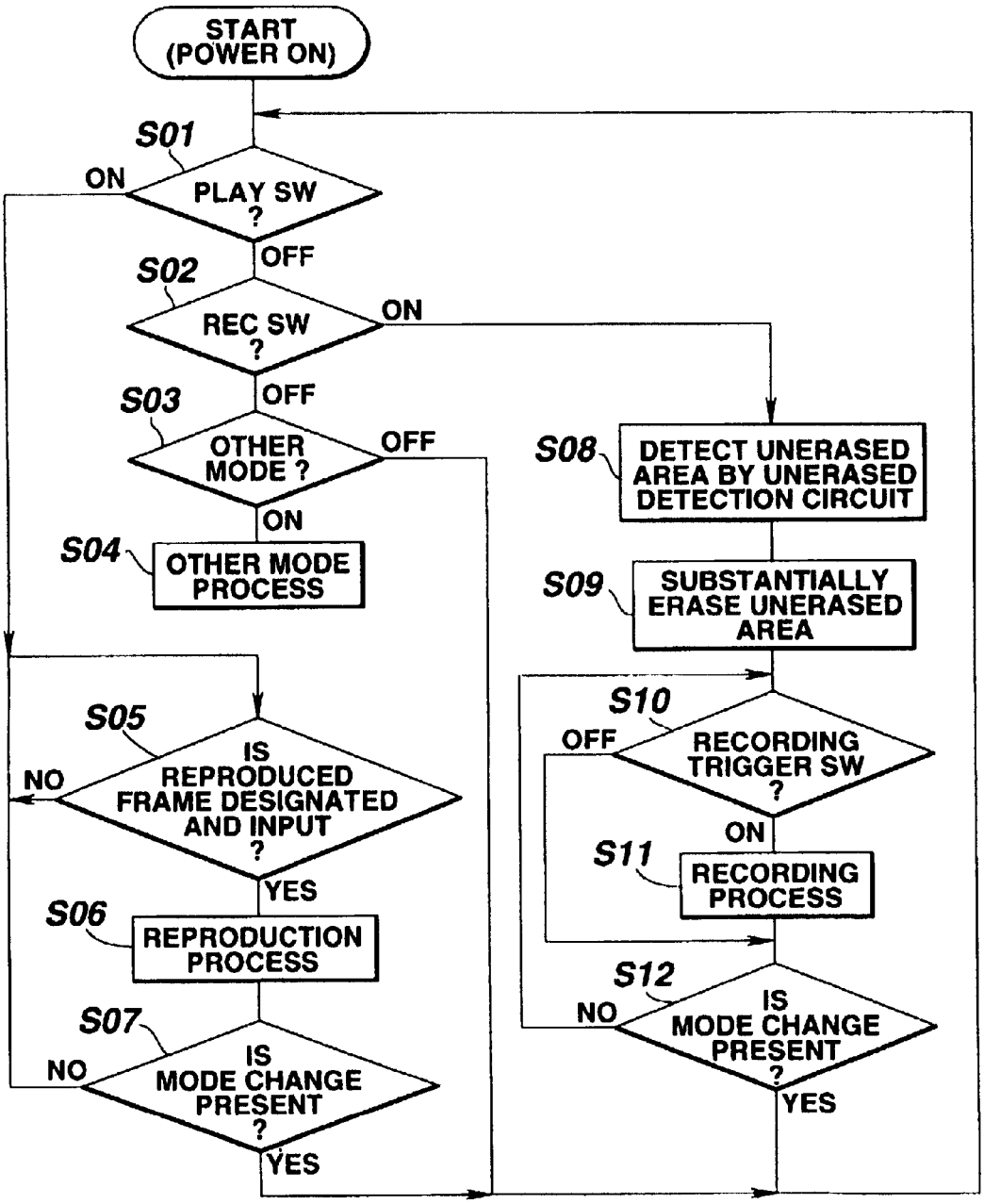
FIG. 2 is a flow chart of a processing operation in the image recording apparatus in FIG. 1.

When it is detected in step S22 that the image reception mode SW 9f is pressed, the flow shifts to step S28 to cause an unerased area detection circuit 6 described in FIGS. 2 and 3 to perform an operation of detecting an unerased area.

After the unerased area is substantially erased in step S29, it is determined in step S30 whether a telephone incoming call is present. If YES in step in step S30, an image reception process is executed in step S31.

Furthermore, it is determined in step S32 whether a mode change is present. If NO in step S32, a process of waiting for a telephone incoming is performed. If YES in step S32, the flow returns to step S21 to execute a newly set mode process.

In the operation in FIG. 4, an unerased area is substantially erased in step S29. This process corresponds to step S09 in FIG. 2. The substantially erasing operation actually means the following process depending on a recording media. In particular, when a card media using a flash memory as a media is used, FFh is written at an address in a corresponding area.

The image recording apparatus of this embodiment is characterized in that a card media constituted by a flash memory is detachably arranged. Especially, when a card which is detachably arranged is used, the effect of the apparatus is enlarged.

For example, when a card media which is erased by an image recording apparatus except for the above apparatus is used as the above recording media, in particular, when a card media in which erasing is performed by an external apparatus such as a personal computer, the card medium is a card in which the number of unerased areas, i.e., areas subjected to a pseudo-erasing operation, becomes very large. When a card media in which image data is erased by this apparatus itself is used, a substantially erasing operation may be completely performed in the erasing mode. However, since the pseudo-erasing process is mainly performed in another personal computer or the like as described above, the number of areas which are pseudo-erased becomes very large in the card media as described above.

Therefore, when a card-like media constituted by a flash memory which is detachably arranged is used, the above very large number of pseudo-erased areas are substantially erased in the apparatus of this embodiment before a telephone line is connected. For this reason, a period of time in which the telephone line is used is shortened, and the effect becomes large.

An image recording apparatus according to the third embodiment of the present invention will be described below. This image recording apparatus is characterized in that a recording preparation completion display can be performed on an LCD 10 (see FIG. 1) serving as a recording preparation completion display means in the image recording apparatus according to the first or second embodiment. The basic arrangement of the image recording apparatus of the third embodiment is the same as that in FIG. 1, and the same reference numerals as in the first and second embodiments denote the same parts in the third embodiment.

Figure 5:
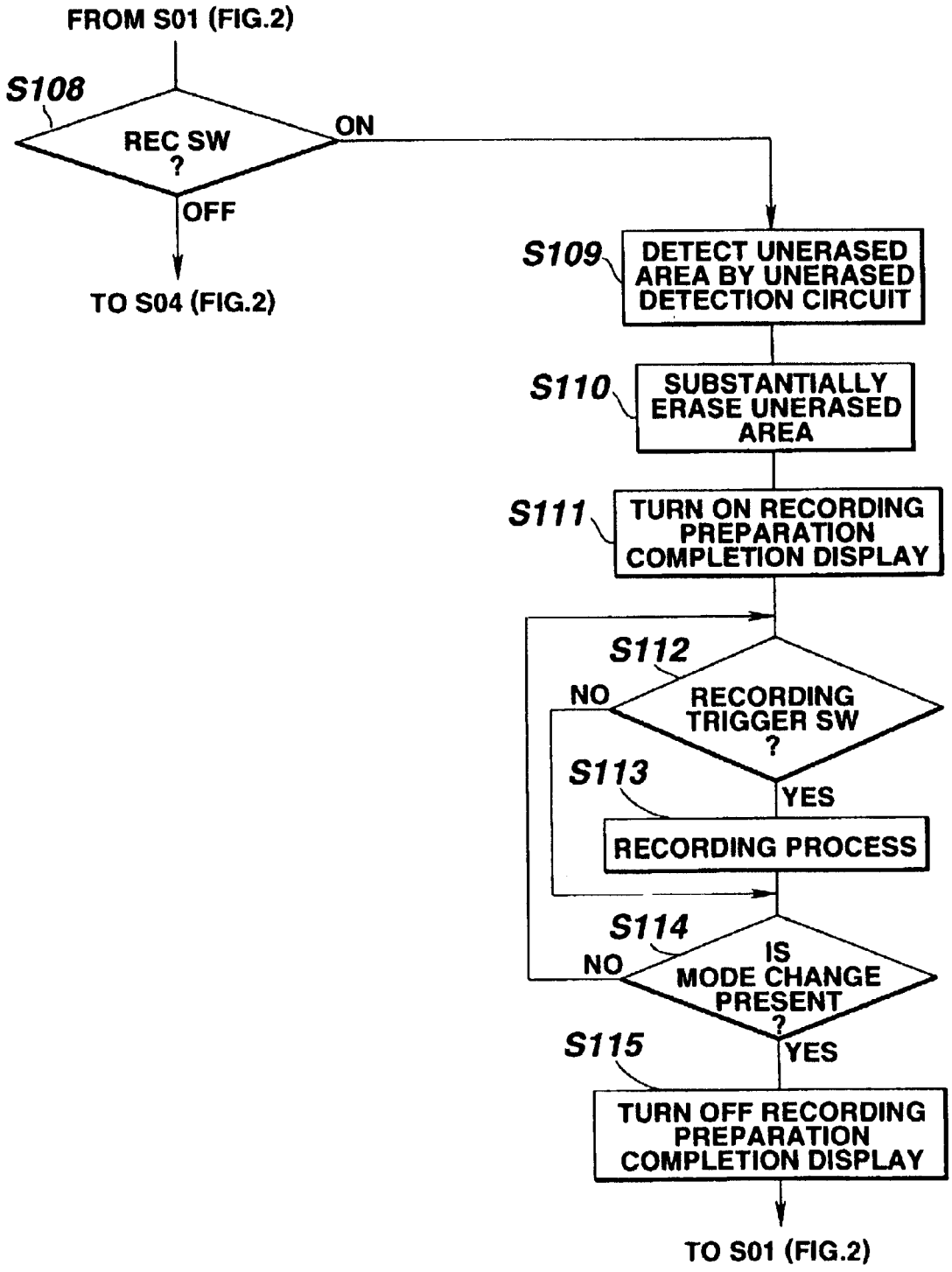
FIG. 5 is a flow chart of a processing operation in an image recording apparatus according to a third embodiment of the present invention.

A processing operation in this image recording apparatus will be described below with reference to the flow chart in FIG. 5. The processing operation in FIG. 5 is obtained by the processes in step S02 and steps S08 to S12 in the flow chart in FIG. 2 are changed into step S108 and steps S109 to S115. The different steps will be described below.

If it is determined in step S01 that a PLAY SW 9c is in an OFF state, the state of a REC SW 9a is checked in step S108. If it is determined that the REC SW 9a is pressed, the flow shifts to step S109 to cause an unerased area detection circuit 6 to detect an unerased area. Subsequently, in step S110, the unerased area is substantially erased.

A recording preparation completion display mark 10a (see FIG. 7) is displayed on the LCD 10 in step S111. The recording preparation completion display mark 10a is an OK mark displayed on the display screen of the LCD 10 in FIG. 7, and the recording preparation completion display mark 10a is flickered.

It is determined in step S112 whether a recording trigger SW 9b is pressed. If YES in step S112, a recording process is executed in step S113. It is detected in step S114 whether a mode change occurs. If YES in step S114, the display of the recording preparation completion display mark 10a is turned off in step S115. The subsequent processes are the same as those in FIG. 2.

According to the image recording apparatus of this embodiment, since a user can decide a timing at which recording can be performed in accordance with the recording preparation completion display, a chance of pressing a release shutter is not missed. In addition, the presence of a substantially unerased area is conveniently displayed.

Figure 6:
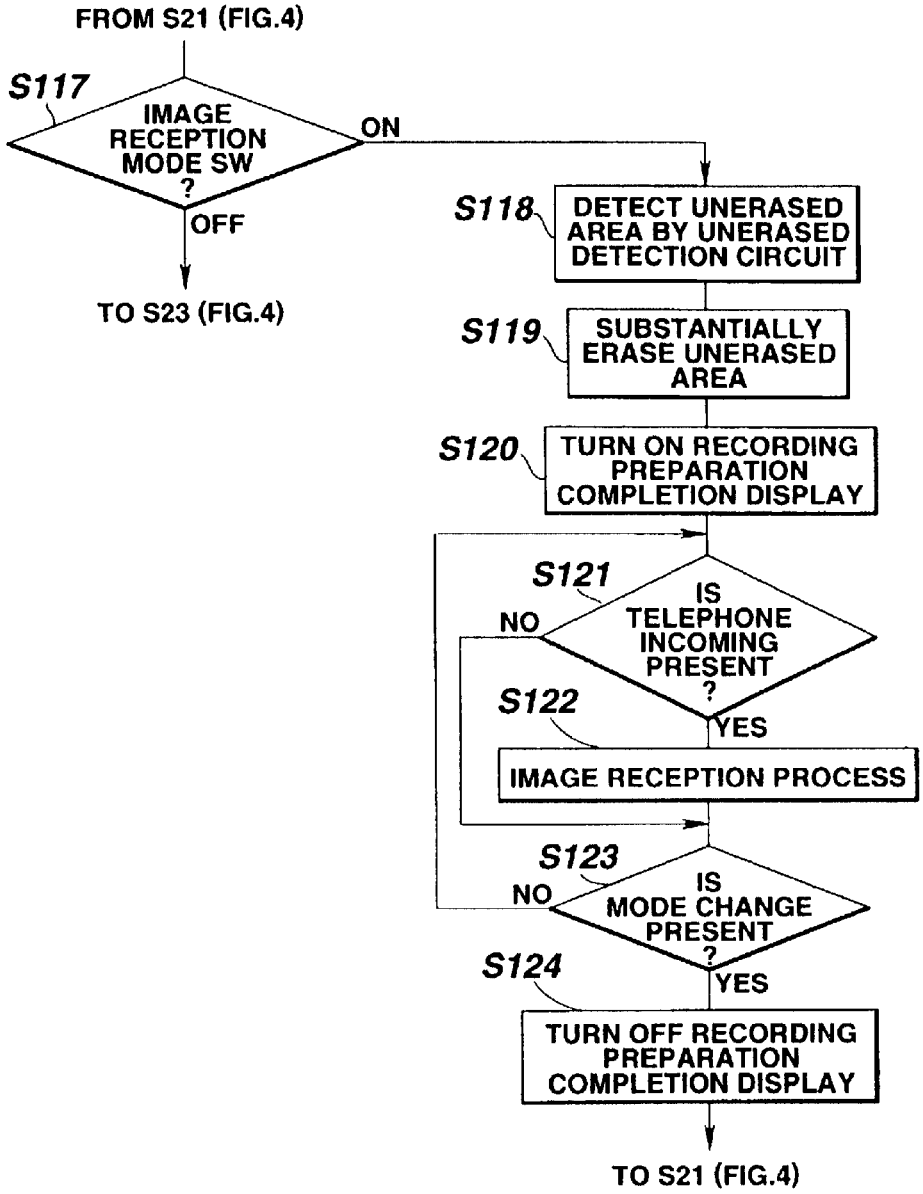
FIG. 6 is a flow chart of a processing operation in a modification of the image recording apparatuses according to the second and third embodiments.

As a modification of the image recording apparatus according to the second and third embodiments, the processing operation of an image recording apparatus which comprises an image reception mode and is capable of performing a recording preparation completion display will be described below with reference to the flow chart in FIG. 6. The processing operation in FIG. 6 is obtained by changing step S22 and steps S28 to S32 in the flow chart of FIG. 4 into step S117 and steps S118 to S124 in FIG. 6. The different steps will be described below.

Figure 7:
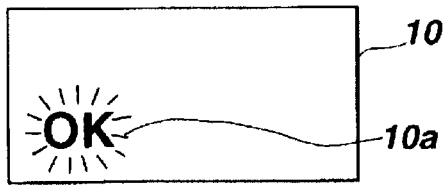
FIG. 7 is a view showing a recording preparation completion display screen of an LCD in the image recording apparatus according to the third embodiment and in the apparatus of the modification of the third embodiment.

As in the apparatus of the third embodiment, if it is determined in step S117 whether an image reception mode SW 9f serving as a mode SW is pressed, an unerased area detection circuit 6 detects an unerased area in step S118. In step S119, the unerased area is substantially erased. In step S120, as shown in FIG. 7, a recording preparation completion display mark 10a is displayed on an LCD 10 serving as a recording preparation completion display means.

Subsequently, it is determined in step S121 whether a telephone call is made, i.e., an incoming call is present. If YES in step S121, an image reception process is performed in step S122. Upon completion of the image reception process, it is determined in step S123 whether a mode change occurs. If YES in step S123, the recording preparation completion display is turned off in step S124. Thereafter, the same subsequent operation as that in the flow chart of FIG. 4 is performed.

According to the image recording apparatus of this modification, since an excessive period of time during transmission is shortened, a large telephone fee is avoided. In addition, the presence of a substantially unerased area is conveniently displayed.

An image recording apparatus according to the fourth embodiment of the present invention will be described below. In the conventional image recording apparatus or each of the image recording apparatuses described above, when a recording media is detachable, if the recording media is erroneously ejected during an erasing or recording operation, an area in which data is being written or erased at this time is disabled eternally. The image recording apparatus according to this embodiment can prevent, especially, such an inconvenient state from occurring. The basic arrangement of the image recording apparatus of this modification is the same as that in FIG. 1, and the same reference numerals as in the first embodiment denote the same parts in the modification.

Figure 8:
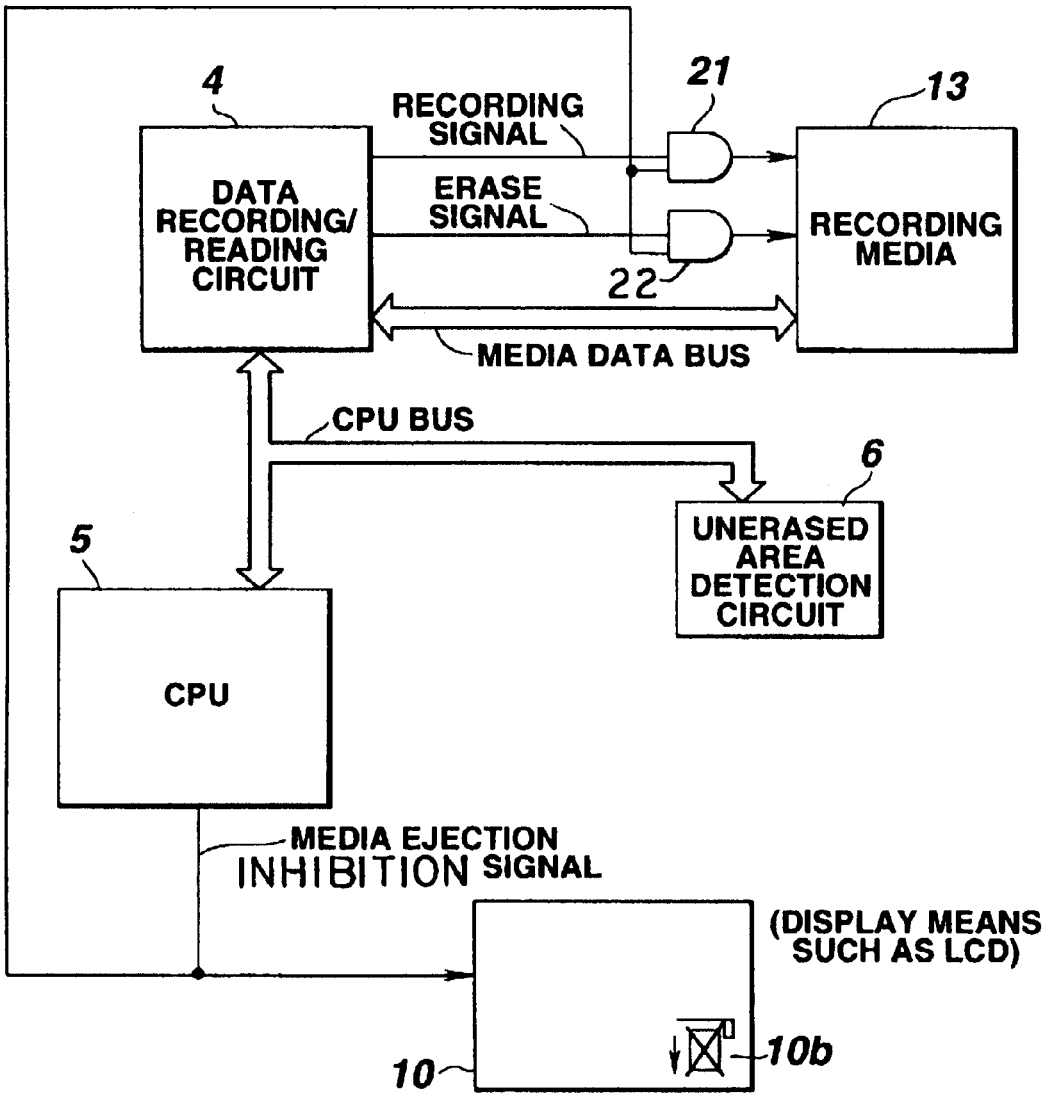
FIG. 8 is a main block diagram showing an image recording apparatus according to a fourth embodiment of the present invention.

FIG. 8 is a main block diagram of the image recording apparatus of this embodiment. It is assumed that the constituent elements shown in FIG. 8 are the same as those in the block diagram in FIG. 1. In this image recording apparatus, the CPU 5 records or erases image data on/from the recording media 13 through a data recording/reading circuit 4. Gate elements 21 and 22 in which a recording signal or an erase signal becomes active when a media ejection inhibit signal output from a CPU 5 is active are arranged before the recording media 13. More specifically, the image recording apparatus of this embodiment is arranged such that the CPU 5 can cause the gates 21 and 22 to write or erase data on/from the recording media 13 while a media ejection inhibit display mark 10b is displayed on the LCD 10 serving as a media removal inhibit display means by the media ejection inhibit signal.

Figure 9:
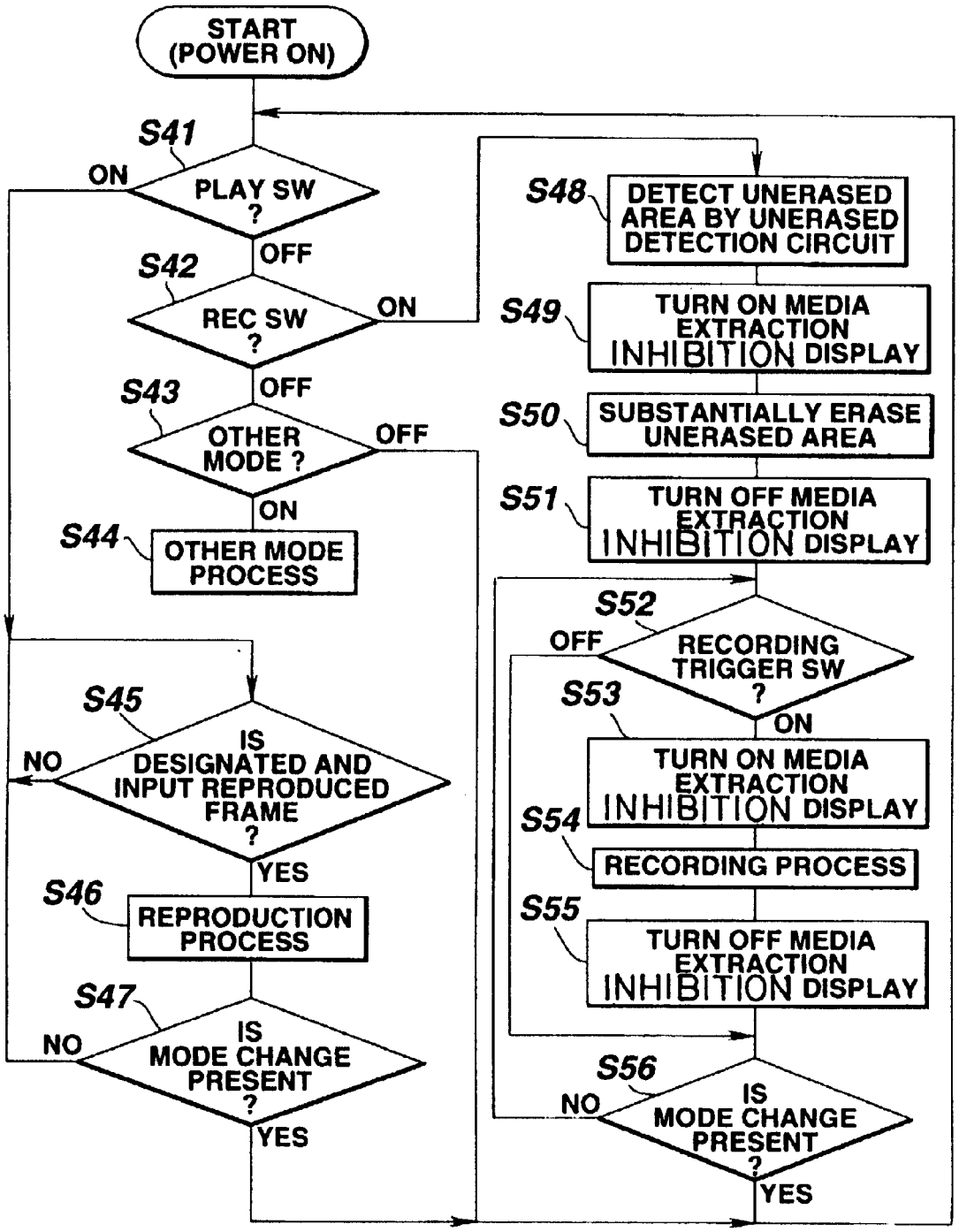
FIG. 9 is a flow chart of a processing operation of the image recording apparatus in FIG. 8.

An operation in this image recording apparatus will be described below with reference to the flow chart in FIG. 9. When a power supply is turned-on to set a power ON state, a pressed mode SW is detected in steps S41, S42, S43, and S44. For example, if a PLAY SW 9c is pressed in step S41, the flow shifts to step S45 to perform a reproduction process.

If it is detected in step S42 that a REC SW 9a serving as a recording mode switch is pressed, an unerased area is detected by an unerased area detection circuit 6 in step S48 A media ejection inhibit display is turned on in step S49. That is, the media ejection inhibit display mark 10b shown in FIG. 8 is displayed on the LCD 10.

In step S50, the unerased area is substantially erased. Upon completion of this process, the media ejection inhibit display is turned off in step S51.

Upon completion of the above processes, the flow waits in the routine from step S52 to step S56 until the recording trigger SW 9b is pressed in step S52. When the recording trigger SW 9b is pressed, the media ejection inhabit display mark 10b is displayed in step S53. A recording process is performed in step S54, and the media ejection inhibit display mark 10b is turned off in step S55.

As described above, in this image recording apparatus, when the media ejection inhibit signal is active, and a recording or erasing signal is active, the first recording/erasing operation for the recording media 13 can be performed. When the recording or erasing signal is inactive, i.e., when a writing operation is not performed, a writing for erasing operation for the recording media 13 is not performed.

Even if the recording or erasing signal becomes active, unless the media ejection inhibit signal becomes active, the writing or erasing signal is not transmitted to the recording media 13, i.e., only while the media ejection inhibit display mark 10b is displayed on the LCD 10, the writing or erasing signal is transmitted to the recording media 13.

As described above, according to the image recording apparatus of this embodiment, since the media ejection inhabit display mark 10b is displayed while the processes in steps S50 and S54 are performed, a user can easily understand that the media 13 is inhibited from being removed. The media can be prevented from being broken by erroneous ejection.

Figure 10:
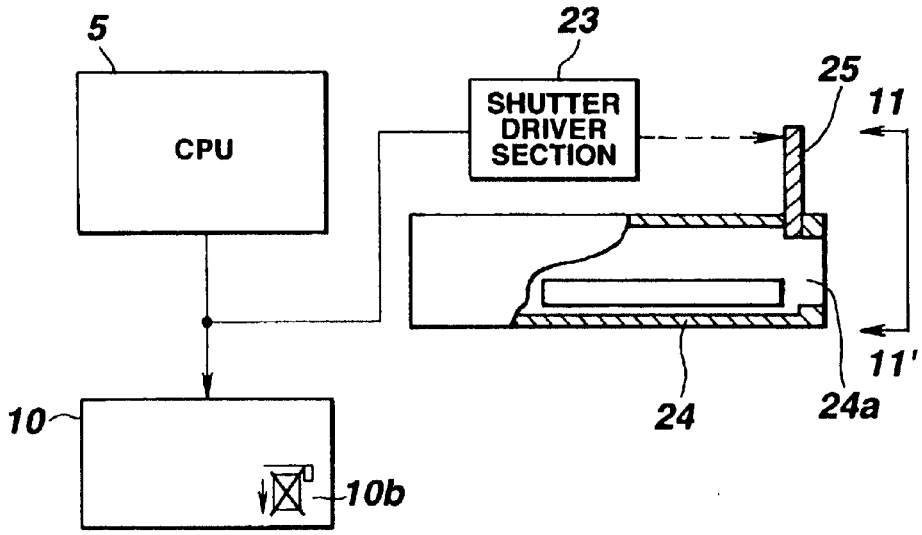
FIG. 10 is a main block diagram showing an image recording apparatus according to a fifth embodiment of the present invention.
Figure 11:
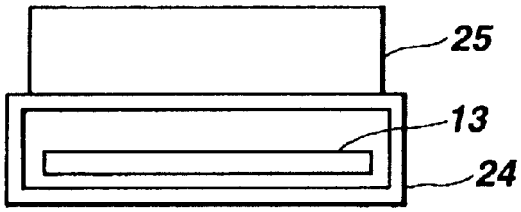
FIG. 11 is a sectional view showing the image recording apparatus along a line 11-11' in FIG. 10.
Figure 12A:
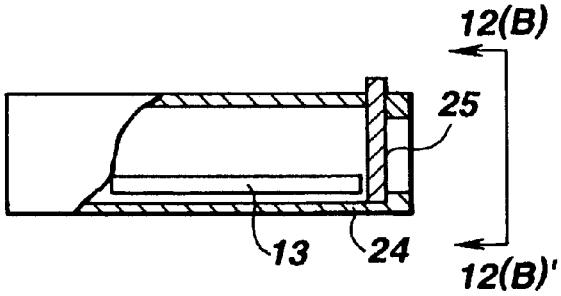
FIG. 12(A) is a side view showing a shutter closing state of a media recording unit in the image recording apparatus in FIG. 10.
Figure 12B:
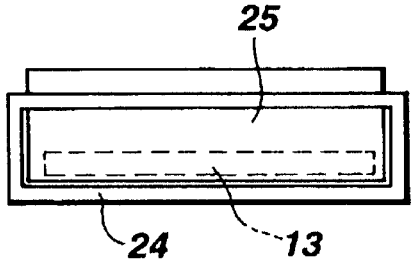
FIG. 12(B) is a view showing a shutter closing state of the media recording unit in the image recording apparatus in FIG. 10, and is a sectional view showing the image recording apparatus along a line 12(B)-(B)' in FIG. 12(A).

An image recording apparatus according to the fifth embodiment of the present invention will be described below. In this image recording apparatus, as in the apparatus according to the fourth embodiment, when an ejection inhibit signal of a CPU 5 becomes active, a media ejection inhibit display mark 10b is displayed on an LCD 10. In this embodiment, in this period, a shutter drive section 23 serving as a media removal prevention mechanism shown in the block diagram in FIG. 10 closes a media receiving port 24a of a media recording unit 24 as shown in FIG. 12(A) and FIG. 12(B) which is a sectional view showing the image recording apparatus along a line 12(B)-12(B) in FIG. 12(A). The opening/closing shutter 25 is closed as described above, so that the recording media 13 (memory card) is inhibited from being ejected. FIG. 10 shows a state wherein the opening/closing shutter 25 in the media recording unit 24 is open, and FIG. 11 is a sectional view showing the apparatus along a line 11-11' in FIG. 10.

When a media ejection inhibit signal is active, i.e., while the media ejection inhibit display mark 10b is displayed on the LCD, the opening/closing shutter is closed. At a timing at which ejection of the media is inhibited, even if a user tries to eject the media, the media cannot be ejected. Therefore, the media can be reliably prevented from being erroneously ejected.

An image recording apparatus according to the sixth embodiment of the present invention will now be described. The image recording apparatus according to this embodiment can read a compression mode and perform a process of substantially erasing only an expectedly recording area. The operation of this embodiment will be described below with reference to the flow chart in FIG. 13. The basic arrangement of this apparatus is the same as that in FIG. 1, and the same reference numerals as in the first embodiment denote the same parts in the apparatus.

When the power supply is turned on, i.e., a power ON state is set, mode detection is performed in steps S61, S62, and S63. When it is detected in step S61 that a PLAY SW 9c serving as a reproduction switch or when it is detected in step S63 that an other mode SW 9e is pressed, the reproduction process in step S65 and the subsequent steps or an other mode process in step S64 is respectively performed. These processes are the same as those shown in FIG. 2.

If it is detected in step S62 that a REC SW 9a serving as a recording switch is pressed, a compression mode setting is read in step S68. The size of an image to be photographed is predicted in step S69, and an expectedly recording area can be determined, thereby substantially erasing the area. When the substantially expectedly recording area is substantially erased, an OK mark which is the same as the recording preparation completion display mark 10a shown in FIG. 7 is flickered on the LCD 10 in step S70.

Figure 14:
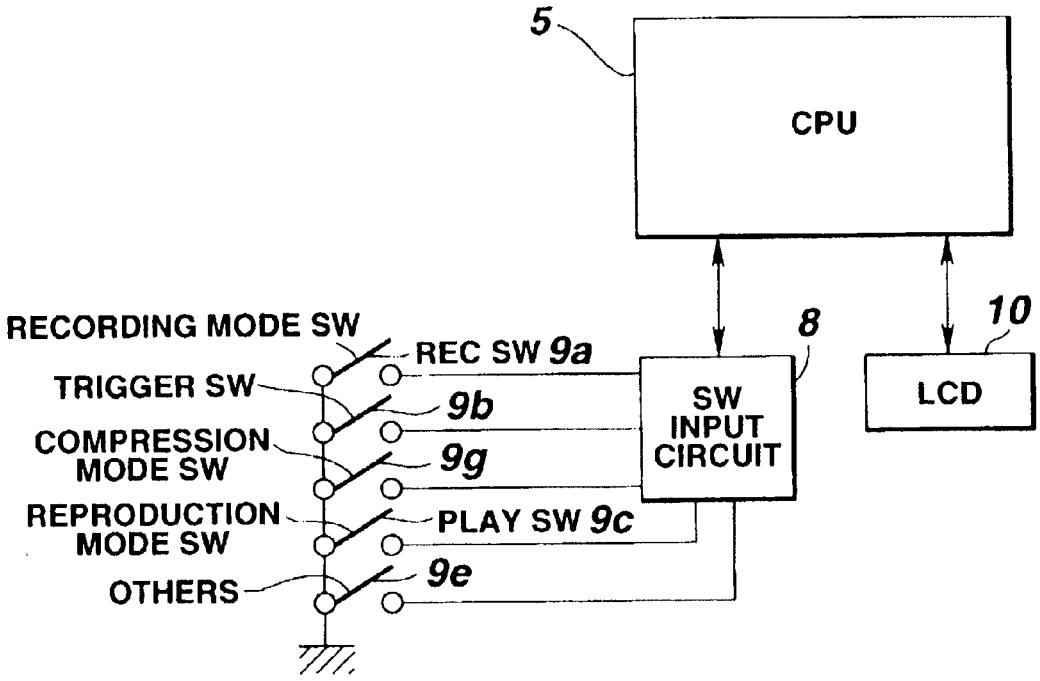
FIG. 14 is a main block diagram showing the image is recording apparatus in FIG. 13.

Although compression mode setting is read in step S68, the compression mode setting is performed in the following manner. That is, a signal from the compression mode SW 9g of the mode setting switches shown in the main block diagram of the image recording apparatus of this embodiment in FIG. 14 is output to a switch (SW) input circuit 8. When the signal is read by a CPU 5, compression mode setting is performed.

The compression modes will be described below. When a fixed length compression mode of the compression modes is set, the size of an image to be photographed is determined such that the file size of data of an image to be photographed is set to, e.g., 72 kbytes or 32 kbytes, or 720 kbytes in non-compression. When the size is determined, an expectedly recording area is determined in step S69, and the area is substantially erased. More specifically, in an operation memory used when the unerased area described in FIG. 3 is detected, the number of clusters used at an address where a value is set to 0h or the number of clusters used at an address where a value is set to 55h is determined in step S69, the areas (clusters) are substantially erased.

A recording preparation completion display is turned on in step S70, and the recording preparation completion display mark 10a shown in FIG. 7 is displayed on the LCD 10. When a user watches the display, the user can recognize that an image can be recorded.

Thereafter, in the routine from step S71 to step S74, the flow waits until a recording trigger SW 9b is pressed or a mode change occurs. When the recording trigger SW 9b is pressed, a recording process is performed in step S72, and the recording preparation completion display is turned off in step S73.

Immediately after step S73, even if the recording trigger SW 9b is pressed, a substantially erasing operation of the expectedly recording area is not completed in this image recording apparatus. For this reason, a recording operation cannot be immediately started. After step S73, the flow returns to step S68 (through steps S61 and S62) to read compression mode setting, and the expectedly recording area is erased in step S69. Thereafter, a period in which a recording process can be performed immediately after the recording trigger SW 9b is turned on is set, and the recording preparation completion display is turned on at step S70.

If it is determined in step S74 that a mode change is present, the recording preparation completion display is turned off in step S75. When the mode change occurs, the recording process cannot be performed in the step S75 and the subsequent steps. For this reason, the recording preparation completion display is turned off in step S75. The flow returns to step S61 to execute a mode process corresponding to the pressed switch in the subsequent steps.

The main block diagram showing the image recording apparatus in FIG. 14 will be described again in detail. This apparatus has a switch group (to be described later), a switch input circuit 8, and an LCD 10. An OK mark serving as the recording preparation completion display mark 10a shown in FIG. 7 can be displayed on the LCD 10. In the switch input circuit 8, a REC SW 9a, a recording trigger SW 9b, a reproduction mode SW 9g, and a compression mode SW 9c are arranged.

A signal from the switch group is received by the switch input circuit 8, and the CPU 5 reads a pressed switch state on the basis of an output from the switch input circuit 8.

Figure 13:
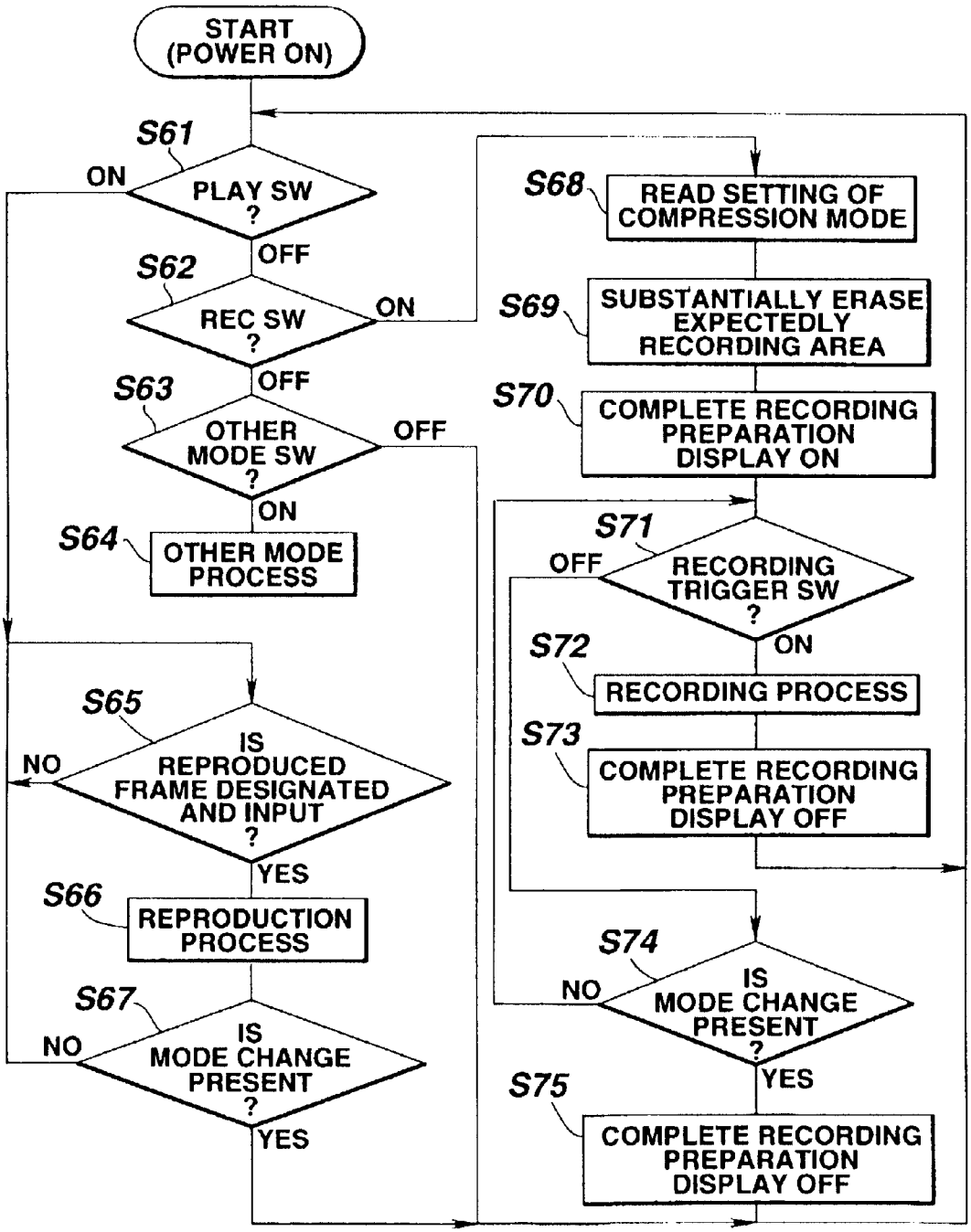
FIG. 13 is a flow chart of a processing operation of an image recording apparatus according to a sixth embodiment of the present invention.

In the image recording apparatus according to this embodiment, compression mode setting is actually read in step S68 in FIG. 13, and an expectedly recording area is predicted in step S69. For example, it is assumed that prediction that cluster numbers are recorded in areas 1, 2, N−1, and N is made. When the areas N−1 and N are pseudo-erased but are not substantially erased, the areas N−1 and N and the cluster area are substantially erased. That is, a value FFh is entirely written in the (N−1)th and Nth clusters.

In the recording process in step S72, a recording operation is performed to the areas of the clusters 1, 2, N−1, and N. Therefore, the recording process is not limitedly performed to only a portion where a substantially erasing operation is performed in step S69. More specifically, image data is recorded in the areas which have been substantially erased, i.e., the first and second clusters serving as cluster areas corresponding to an address where 55h is written and the (N−1)th and Nth clusters in which the substantially erasing operation is performed in step S69.

According to the image recording apparatus of this embodiment, even if a media which cannot be overwritten is used, a period of time from when the recording trigger SW 9b is pressed to when a recording operation is completed can be shortened, and a period of time required to perform a substantially erasing operation once can be shortened. For this reason, a chance of pressing a release shutter is rarely missed.

An image recording apparatus according to the seventh embodiment of the present invention will be described below. This image recording apparatus can use many types of recording media. In the image recording apparatus, a recording process can be changed depending on the type of a memory card serving as a recording media. The same reference numerals as in the block diagram of FIG. 1 denote the same constituent parts in this apparatus.

A processing operation of this embodiment will be described below with reference to the flow chart in FIG. 15. When a power supply is turned on, the type of a media is determined in step S80. A pressed SW in the routine in steps S81, S82, and S83 is determined. For example, when it is determined in step S81 that the PLAY SW 9c is pressed, the flow shifts to step S85 to perform a reproduction process to each media type. More specifically, a process for a media type determined in step S80 is performed in step S85.

Similarly, when the REC SW 9a is pressed, a recording process is performed in step S86 on the basis of the determination result of a media type in step S80. As in another mode, when the other mode SW 9e is pressed in step S83 and the subsequent steps, an other mode process is executed in step S87 depending on a media type determined in step S80.

If a change in media is detected in step S84, for example, the media is removed from the image recording apparatus. When another recording media is inserted into the image recording apparatus, the type of the recording media is determined in step S80.

According to the image recording apparatus of this embodiment, various types of-recording media can be used in one apparatus without increasing the apparatus in size.

Figure 16:
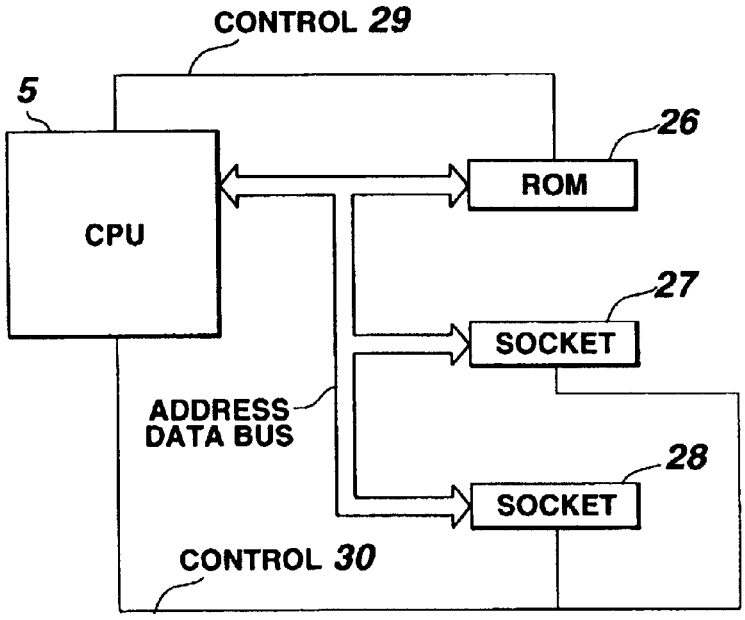
FIG. 16 is a main block diagram showing a modification of the image recording apparatus according to the seventh embodiment.

As a modification of the image recording apparatus of the seventh embodiment, an apparatus in which a processing method for each of the recording media types can be selected by adding a ROM will be described below. As shown in the main block diagram of the apparatus of this modification in FIG. 16, a ROM 26 serving as a fixed storage means is arranged around a CPU 5, and additional ROM sockets 27 and 28 in which an additional ROM can be inserted are arranged as processing program adding means.

The additional ROM sockets 27 and 28 are connected to the CPU 5 by an address and a data bus. The CPU 5 can control the inserted ROM 26 in accordance with a control signal 29. When an additional ROM is inserted into the ROM sockets 27 and 28, a processing method is read from the additional ROM in accordance with a control signal 30, so that the processing can be executed.

According to the image recording apparatus of this modification, when an additional ROM is arranged depending on a determination of a user, many types of recording media can be used in one apparatus without increasing the apparatus in size.

Figure 17:
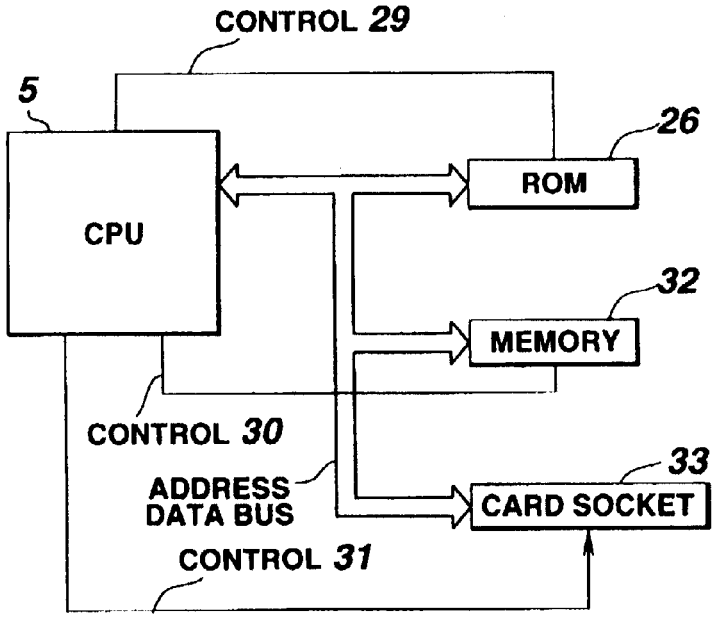
FIG. 17 is a main block diagram showing another modification of the image recording apparatus according to the seventh embodiment.

As another modification of the image recording apparatus of the seventh embodiment, an apparatus which can select a processing method for each of the recording media types without adding a ROM will be described below. FIG. 17 is a main block diagram showing the apparatus of this embodiment. As in the apparatus of the previous modification, the CPU 5 and the ROM 26 are arranged, and a flash memory or a memory 32 such as an EEPROM is arranged as another memory. In addition, a memory card socket 33 in which a card-like detachable recording media such as an SRAM card, a ROM card, or a modem card can be inserted is arranged.

The ROM 26, the memory 32, and the memory card socket 33 are connected to each other with an address data bus. The ROM 26, the memory 32, and the recording media inserted in the memory card socket 33 are controlled by control signals 29, 30, and 31.

When a process for each card type is copied from a recording media such as an SRAM card, a ROM card, or a modem card inserted in the memory card socket 33 to the memory 32, the process for each card type can be additionally registered.

Figure 18:
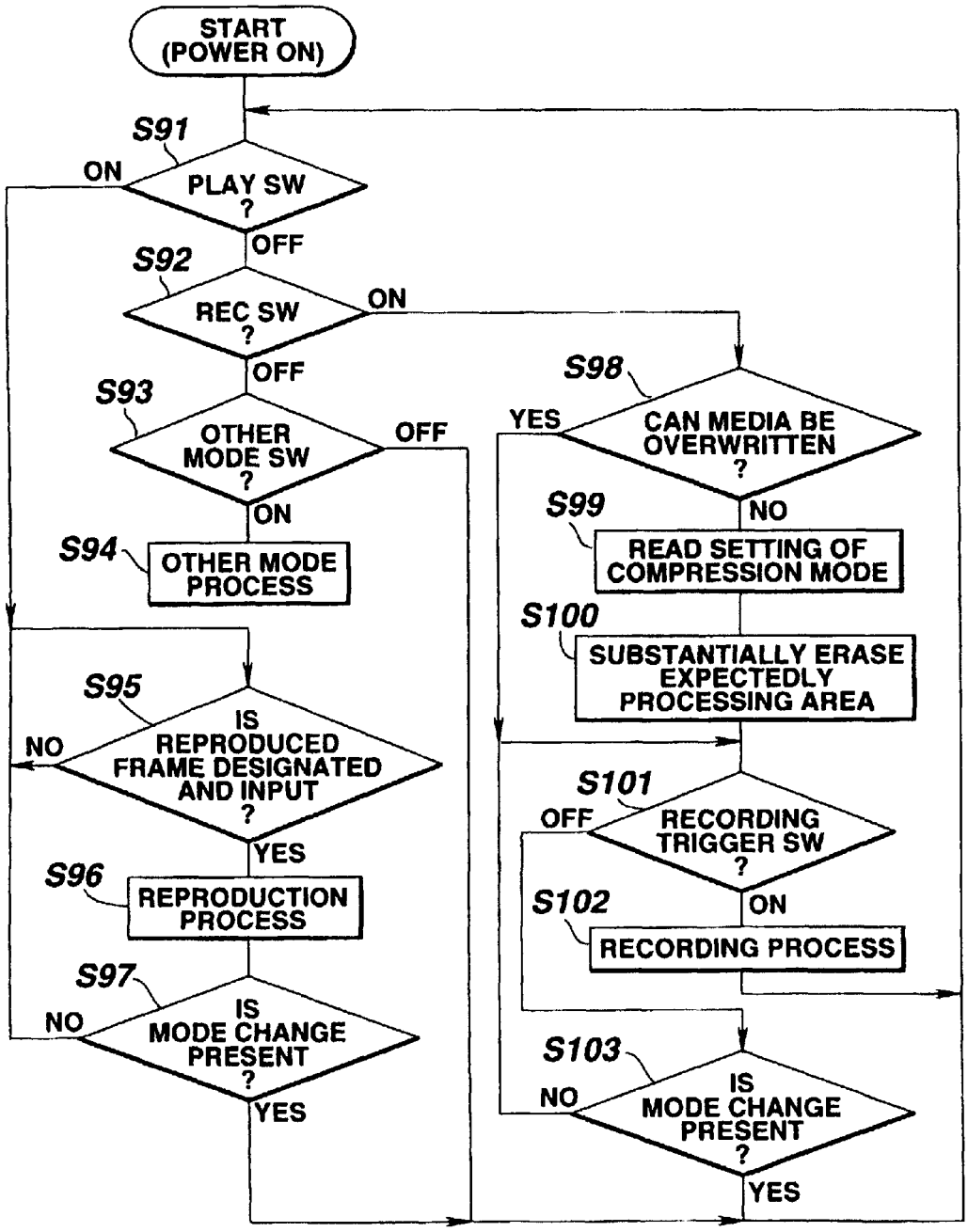
FIG. 18 is a flow chart of a processing operation of an image recording apparatus according to an eighth embodiment of the present invention.

An image recording apparatus according to the eighth embodiment of the present invention will be described below. This apparatus is an apparatus corresponding to, especially, two types of recording media one of which can be overwritten and the other of which cannot be overwritten. FIG. 18 is a flow chart of this operation.

If it is detected in step S91 that a PLAY SW 9c is pressed, a reproduction process is performed as in the flow chart of FIG. 2. If it is detected in step S92 that the REC SW 9a is pressed, it is determined in step S98 whether the recording media can be overwritten. If YES in step S98, a state wherein recording trigger reception can be performed is immediately set in step S101.

However, if NO in step S98, compression mode setting is read in step S99, and an expectedly recording area is substantially erased in step S100. More specifically, the process of determining whether the recording media can be overwritten in step S98 is a branch point. When the recording media can be overwritten, a recording trigger receivable state can be immediately set. In contrast to this, when the media cannot be overwritten, a recording trigger receivable state cannot be set until an expectedly recording area is substantially erased.

Upon completion of the recording process in step S102, the flow returns to step S98 (through steps S91 and S92) to perform the process of determining whether the media can be overwritten. If a mode change occurs in step S103, an other mode process is executed as in FIG. 2. The same operation as in FIG. 2 is performed except for the above recording operation.

According to the image recording apparatus of this embodiment, either a recording media such as an SRAM memory card which can be overwritten or a recording media such as an ATA flash card which cannot be overwritten can be used as a recording media in one apparatus without increasing the apparatus in size.

What is claimed is:

1. An image recording apparatus in which an image recording media which logically has an image data recording area and an image data management area for managing a recording state of image data in said image data recording area and cannot be overwritten is applied, [and] *comprising:*

[including image data pseudo-erasing means for executing a predetermined process to said image data management area to erase image data on said image recording media, so that the image data in said image data recording area is pseudo-erased, characterized by comprising:]

recording mode setting means for setting a recording mode for recording image data [by] *in* said image recording media;

unerased [area] *data* detection means for [performing an erasing operation by said image data pseudo-erasing means to detect] *detecting* an *unerased* image data [unerased] area in said image data recording area of said image recording media;

image data erasing means for substantially erasing image data in said unerased area detected by said unerased area detection means; [and]

control means for performing control such that said unerased area detection means detects an *unerased* image data [unerased] area in response to a recording mode setting operation by said recording mode setting means, and said image data erasing means starts a substantially erasing operation for image data in said detected unerased area*; and*

*image data pseudo-erasing means for executing a predetermined process to said image data management area to erase image data on said image recording media, so that the image data in said image data recording area is pseudo-erased.*

2. An image recording apparatus according to claim 1, characterized in that said image recording apparatus further comprises image reception mode setting means for setting an image reception mode for receiving image data transmitted through a predetermined telephone line, and said control means performs control such that said unerased area detection means detects an image data unerased area in response to a recording mode setting operation by said recording mode setting means, and said image data erasing means starts a substantially erasing operation for image data in said detected unerased area.

3. An image recording apparatus according to claim 1 or 2, characterized in that said image recording media is a card-like media constituted by a flash memory detachably arranged in a main body of said apparatus.

4. An image recording apparatus according to claim 1 or 2, characterized in that said image data erasing means further comprises recording preparation completion display means for indicating that a substantially erasing operation for image data in an unerased area detected by said unerased area detection means is completed.

5. An image recording apparatus according to claim 1, characterized in that said image recording media is detachably arranged in said apparatus, and further comprising media removal inhibit display means for directly displaying that said image recording media is inhibited from being removed from said apparatus during an image data recording operation or an image data erasing operation by said image data erasing means with a picture, character, sign, or the like to inhibit the image recording media from being removed from said apparatus.

6. An image recording apparatus according to claim 1, characterized in that said image recording media is detachably arranged in said apparatus, and further comprising media removal inhibit display means for performing a display to inhibit said image recording media from being removed from said apparatus; and means for allowing a recording operation for image data during only a display by said media removal inhibit display means and an erasing operation for the image data by said image data erasing means.

7. An image recording apparatus according to claim 1, characterized in that said image recording media is detachably arranged in said apparatus, and further comprising a media removal prevention mechanism for preventing said image recording media from being removed from said apparatus during an image data recording operation or an image data erasing operation by said image data erasing means.

8. An image recording apparatus in which an image recording media which logically has an image data recording area and an image data management area for managing a recording state of image data in said image data recording area and cannot be overwritten is applied, and including image data pseudo-erasing means for executing a predetermined process to said image data management area to erase the image data on said image recording media, so that the image data in said image data recording area is pseudo-erased, characterized by comprising:

recording mode setting means for setting a recording mode for recording image data on said image recording media;

compression mode setting means for setting one compression mode from a plurality of compression modes having different compression rates to determine a compression rate of image data to be recorded on said image recording media;

image data erasing means for substantially erasing image data in an image data unerased area in said image data recording area by said image data pseudo-erasing means; and control means for performing control such that an image data expectedly recording amount based on a corresponding compression rate and an image data expectedly recording area are determined on the basis of a compression mode set by said compression mode setting means, and said image data erasing means starts a substantially erasing operation for image data whose amount corresponds to said expectedly recording area determined in said image data unerased area.

9. An image recording apparatus according to claim 8, characterized by further comprising recording preparation completion display means for indicating that said image data erasing means completes a substantially erasing operation of image data whose amount corresponds to the expectedly recording area determined by said control means.

10. An image recording apparatus in which many types of image recording media having different recording process operations for at least image data to be recorded are detachably arranged in the recording apparatus, [characterized by] comprising:

media type determination means for determining a type of said image recording media inserted in said apparatus;

fixed storage means for storing a plurality of processing programs corresponding to processing speeds, erasing methods, and the like of the types of media which can be inserted into the apparatus;

control means for selecting a corresponding processing program in said fixed storage means responsive to a determination result of said media type determination means to execute a predetermined processing operation on the basis of the selected processing program; and processing program adding means being provided for additionally storing a new processing program corresponding to an additional media type *image recording medium* which may be inserted in said fixed storage means.

11. An image recording apparatus in which any one of an image recording media which logically includes an image data recording area and an image data management area for managing a recording state of image data in said image data recording area and can be overwritten and an image recording media which logically includes image data recording and image data management areas and cannot be overwritten is applied and detachably arranged in said apparatus, and including image data pseudo-erasing means for executing a predetermined process to said image data management area to erase image data in said image recording media so that the image data in said image data recording area is pseudo-erased, characterized by comprising:

recording mode setting means for setting a recording mode for recording image data on said image recording media, unerased area detection means for performing an erasing operation by said image data pseudo-erasing means to detect an image data unerased area in said image data recording area of said image recording media;

image data erasing means for substantially erasing image data in said image data unerased area detected by said unerased area detection means;

media type determination means for determining a type of image recording media inserted in said apparatus; and control means for performing control such that an erasing operation of said image data erasing means is inhibited during a recording mode setting by said recording mode setting means when it is determined as a determination result by said media type determination means that said media can be overwritten, said unerased area detection means detects an image data unerased area in response to a recording mode setting operation by said recording mode setting means when it is determined as a determination result by said media type determination means that said media cannot be overwritten, and said image data erasing means starts a substantially erasing operation for image data in said detected unerased area.

12. The apparatus of claim 10 wherein said adding means further comprises sockets each for receiving a read-only-memory containing at least one additional processing program.

13. The apparatus of claim 10 wherein said adding means further comprises a socket for detachably receiving a memory device having at least one additional processing program, said apparatus including means for transferring the processing program in said memory device to said fixed memory means.

14. The apparatus of claim 12 wherein said control means includes means for selecting one of the fixed memory device, and read-only-memories inserted in said sockets according to the recording media inserted into the apparatus as identification by said determination means.

*15. An apparatus for recording digital image data, comprising:*

*a removable and nonvolatile recording medium, including both a data management section and a substantial data recording section in which substantial data is stored;*

*a control unit which controls a recording sequence of a digital image data in the recording media; and*

*a media management unit which, responsive to an operation of the control unit, at least reads an unerased data in the substantial data recording section and substantially erases the unerased data read from the substantial data recording section; wherein the substantial data recording section of the removable recording medium is configured so that it cannot be overwritten without initialization.*

*16. The apparatus according to claim 15, wherein the apparatus includes a unit for removably receiving recording media.*

*17. The apparatus according to claim 16, wherein the recording media is a flash memory device.*

*18. The apparatus according to claim 16, wherein the recording media is a photomagnetic optical disk.*

*19. The apparatus according to claim 16, wherein the recording media is a magnetic disk.*

*20. An electronic camera comprising:*

*an image recording media logically having an image data recording area and an image data management area for managing a recording state of image data in said image data recording area wherein said media is compatible with an external device including an image data pseudo-erasing unit for executing a predetermined process upon said image data management area to erase image data in said image recording media, so that the image data recording area is pseudo-erased;*

*an unerased image data detection unit for detecting an unerased image data area in said image data recording area of said image recording media;*

*an image data erasing unit for substantially erasing the unerased image data detected in said area by said unerased area detection unit;*

*a recording mode setting unit for setting a recording mode for recording image data in said image recording media; and*

*a control unit for controlling such that said unerased area detection unit detects an unerased image data area in response to a recording mode setting operation by said recording mode setting unit, and said image data erasing unit starts a substantially erasing operation for in said detected unerased image data.*

*21. A method of recording digital image data on a removable and nonvolatile recording medium including both a data management section and a substantial data recording section in which substantial data is stored, said method comprising the steps of:*

*a) initiating a record sequence of a digital image data into the recording media based on information in the data management section in response to a record operation;*

*b) retrieving an unerased substantial data in the substantial data recording section;*

*c) substantially erasing the unerased data retrieved in the substantial data recording section; and*

*d) recording a new image data into the substantial recording section; wherein the substantial data recording section of the removable recording medium is configured so that it cannot be overwritten without initialization.*

*22. The method according to claim 21, wherein the recording media is removable and further comprising:*

*removably inserting the recording media for recording image data thereon.*

*23. The method according to claim 21, wherein the recording media is removable flash memory device and further comprising:*

*removably inserting the recording media for recording image data thereon.*

*24. The method according to claim 21, wherein the recording media is a removable photomagnetic optical disk and further comprising:*

*removably inserting the recording media for recording image data thereon.*

*25. The method according to claim 21, wherein the recording media is a removal magnetic disk and further comprising:*

*removably inserting the recording media for recording image data thereon.*

*26. The method according to claim 21 further comprising:*

*generating a recording operation completion display responsive to completion of step (c).*

*27. The method according to claim 21 further comprising:*

*initiating step (d) responsive to operation of a recording trigger.*

* * * * *